US010300661B2

(12) United States Patent
Marozin

(10) Patent No.: US 10,300,661 B2
(45) Date of Patent: May 28, 2019

(54) METHOD AND EQUIPMENT FOR DEFINING A SUPPORTING STRUCTURE FOR A THREE-DIMENSIONAL OBJECT TO BE MADE THROUGH STEREOLITHOGRAPHY

(71) Applicant: DWS S.R.L., Thiene (VI) (IT)

(72) Inventor: Alessandro Marozin, Breganze (IT)

(73) Assignee: DWS S.R.L., Thiene (IT)

( * ) Notice: Subject to any disclaimer, the term of this patent is extended or adjusted under 35 U.S.C. 154(b) by 0 days.

(21) Appl. No.: 15/128,638

(22) PCT Filed: Mar. 24, 2015

(86) PCT No.: PCT/IB2015/052139
§ 371 (c)(1),
(2) Date: Sep. 23, 2016

(87) PCT Pub. No.: WO2015/145346
PCT Pub. Date: Oct. 1, 2015

(65) Prior Publication Data
US 2018/0215098 A1 Aug. 2, 2018

(30) Foreign Application Priority Data
Mar. 25, 2014 (IT) .............................. VI2014A0074

(51) Int. Cl.
*B29C 64/386* (2017.01)
*G06F 17/50* (2006.01)
(Continued)

(52) U.S. Cl.
CPC ............ *B29C 64/386* (2017.08); *B29C 64/40* (2017.08); *B33Y 10/00* (2014.12); *B33Y 40/00* (2014.12);
(Continued)

(58) Field of Classification Search
CPC ............ B33Y 40/00; G06T 17/00; G06T 1/00; G05B 19/4099; B22C 9/04; G03F 7/0037; B82Y 30/00; B29C 67/0051; G02B 7/182
See application file for complete search history.

(56) References Cited

U.S. PATENT DOCUMENTS 5,999,184 A * 12/1999 Smalley .................. G06T 17/00
345/419
2004/0006405 A1 * 1/2004 Chen .................. G05B 19/4099
700/119
(Continued)

FOREIGN PATENT DOCUMENTS

EP 1 120 228 A2 8/2001

OTHER PUBLICATIONS

PCT International Search Report and Written Opinion.
Pu Huang: "Algorithms for Layered Manufacturing in Image Space—Master Thesis" (Oct. 2012) pp. 1-94, Chapter 5.

*Primary Examiner* — Kandasamy Thangavelu
(74) *Attorney, Agent, or Firm* — Husch Blackwell LLP

(57) ABSTRACT

The invention is a computer-implemented method for defining a supporting structure (2) for a three-dimensional object (1) to be produced through a stereolithography process, comprising the following operations: defining a first surface (3) to be supported of the three-dimensional object (1) and a second surface (4) facing the first surface (3); defining elongated supporting elements (5) between the surfaces (3, 4); defining pairs of supporting elements (5); for each pair of supporting elements (5), defining an elongated reinforcing element (6) connecting the two supporting elements (5) of the pair. The definition of the pairs of supporting elements (5) comprises the following operations: defining a reference point (7) of each supporting element (5); defining a connected acyclic graph (8) having as vertices the reference points (7); for each edge (9) of the graph, defining one pair
(Continued)

of supporting elements comprising the two supporting elements (5) corresponding to the ends of the edge (9). The definition of the pairs of supporting elements (5) comprises the further operation of defining an additional pair of supporting elements for each vertex having order 1 of the connected acyclic graph (8), the additional pair comprising a first supporting element (5) corresponding to the vertex having order 1 and a second supporting element (5) not connected to the first supporting element (5) through any edge (9).

14 Claims, 2 Drawing Sheets

(51) Int. Cl.
*B33Y 10/00* (2015.01)
*B33Y 40/00* (2015.01)
*B29C 64/40* (2017.01)
*B33Y 50/00* (2015.01)

(52) U.S. Cl.
CPC .............. *B33Y 50/00* (2014.12); *G06F 17/50* (2013.01); *G06F 17/5086* (2013.01); *G06F 2217/12* (2013.01)

(56) References Cited

U.S. PATENT DOCUMENTS

| | | | |
|---|---|---|---|
| 2004/0027675 A1* | 2/2004 | Wu | B82Y 30/00 359/619 |
| 2005/0056913 A1* | 3/2005 | Farnworth | G03F 7/0037 257/642 |
| 2009/0072447 A1* | 3/2009 | Hull | B33Y 40/00 264/401 |
| 2009/0231735 A1* | 9/2009 | Torii | G02B 7/182 359/811 |
| 2010/0125356 A1* | 5/2010 | Shkolnik | G06T 1/00 700/98 |
| 2011/0189440 A1* | 8/2011 | Appleby | B22C 9/04 428/156 |
| 2012/0326356 A1* | 12/2012 | Martin | B29C 67/0051 264/401 |

* cited by examiner

METHOD AND EQUIPMENT FOR DEFINING A SUPPORTING STRUCTURE FOR A THREE-DIMENSIONAL OBJECT TO BE MADE THROUGH STEREOLITHOGRAPHY

The present invention concerns a method and a piece of equipment for defining a supporting structure for a three-dimensional object to be made through stereolithography.

As is known, a stereolithography process consists in making a three-dimensional object through the sequential superimposition of a plurality of layers of the object itself.

Each layer of the object is obtained through solidification of a material in the liquid or paste state, which occurs through selective exposure to light radiation. Typically, the material is a plastic-based compound that polymerizes when it is reached by said light radiation.

The solidification of each successive layer of the object takes place in contact with the previous solidified layer, which serves as a support for the successive layer.

The process is controlled by a computer, which is supplied with a first set of data representative of the three-dimensional geometry of the object to be made.

The computer determines the geometry of the different layers of the object and consequently controls a stereolithography device.

Generally, according to the process a supporting structure is also added to the three-dimensional object before its actual production, wherein said supporting structure is solidified at the same time as the object during the stereolithography process.

Said supporting structure supports those portions of the layers to be solidified that, not being supported directly by the already solidified layers, may collapse or be permanently deformed during the process of production of the object.

The definition of the supporting structure is performed by said computer, in which a program is loaded that adds the elements of the supporting structure more or less automatically and generates a second set of data representative of the three-dimensional geometry resulting from the union of the three-dimensional object with the supporting structure itself.

Said second set of data is then used to define the geometry of the layers of the three-dimensional object.

The supporting structure comprises a plurality of supporting elements that connect one or more surfaces to be supported of the three-dimensional object to corresponding surfaces that face the first ones and are intended to be made before them during the stereolithography process.

European application EP 1120228 A2 discloses a method to create the above support structure.

According to a variant of the supporting structure, reinforcing elements are also provided that connect said supporting elements with one another.

The reinforcing elements make the supporting structure sturdier and therefore reduce the risk of collapse of the three-dimensional object during the production step.

According to a known method for defining the supporting structure based on said variant, the supporting structure is defined as a three-dimensional grid that has a predefined shape and is substantially independent of the geometry of the three-dimensional object.

Successively, the elements of the grid that would intersect the three-dimensional object are removed, maintaining only the elements of the grid that are located outside the object itself.

That which remains of the grid is connected to the three-dimensional object through further connection elements, in such a way as to obtain a single object.

Said known method poses the drawback that it does not allow the supporting structure to be defined in an optimal way.

In fact, since the grid of the supporting structure is defined in a manner that is substantially independent of the three-dimensional object, the structure may be undersized or, vice versa, oversized with respect to the structural needs of the object itself.

An undersized supporting structure poses the drawback that its overall volume is not sufficient to properly serve the function of supporting the three-dimensional object.

On the contrary, an oversized supporting structure has an excessively large overall volume.

As the time required by the stereolithography process increases proportionally to the volume to be solidified, an oversized supporting structure negatively affects the overall time required to produce the three-dimensional object.

Furthermore, the larger the volume of the supporting structure, the larger the quantity of material necessary for its production, with the inconvenience of increasing the overall cost of the three-dimensional object.

An oversized supporting structure may also result from an excessively thick grid, with the further inconvenience of hindering the cleaning operations to be carried out on the three-dimensional object at the end of the stereolithography process.

In fact, it is known that an object obtained through stereolithography is washed at the end of the stereolithography process, in such a way as to remove the residues of non-solidified material.

Said washing operation is performed before separating the supporting structure from the three-dimensional object.

Therefore, the supporting structure hinders the flow of washing fluid on some surfaces of the three-dimensional object and the thicker the grid that defines the structure, the more considerable this hindering effect.

Pu Huang, in "Algorithm for Layered Manufacturing in Image Space—Mater Thesis", published in October 2012 by the Chinese University of Hong Kong, discloses an algorithm for building a support structure, the algorithm involving defining a graph the nodes of which correspond to the anchors of the structure, the graph being used to define connections between the anchors.

The present invention intends to overcome all the drawbacks mentioned above related to the supporting structures of known type.

In particular, it is the object of the present invention to provide a supporting structure for a three-dimensional object to be produced through stereolithography having a suitable strength, yet having a smaller overall volume compared to that obtainable with the methods of known type described above.

Said object is achieved through a method for defining a supporting structure according to claim 1.

Said object is also achieved through a piece of equipment for defining said supporting structure according to claim 13.

Said object is achieved also through a computer program product according to claim 14.

Advantageously, the possibility to produce a specific supporting structure for each three-dimensional object ensures that the supporting structure is suitable for the structural needs of the object.

Furthermore, advantageously, this also prevents said supporting structure from being oversized, thus limiting the volume of the structure itself.

The reduced volume of the supporting structure advantageously leads to a reduction in both the overall time required to make the three-dimensional object by means of the stereolithography process and the quantity of material necessary for the processing, and therefore in the cost of the object itself.

Furthermore, advantageously, the smaller volume of the supporting structure makes it easier to wash the three-dimensional object once it has been completed.

Said objects and advantages, together with others that are highlighted here below, will be illustrated in the descriptions of some preferred embodiments of the invention that are provided by way of non-limiting examples with reference to the attached drawings, wherein.

Figure 1:
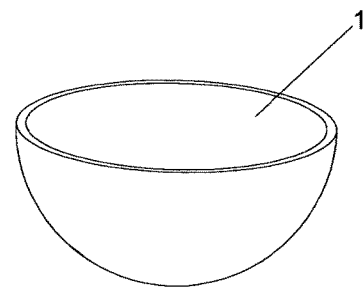
FIG. 1 shows an axonometric view of an example of three-dimensional object to be made through stereolithography.

The method of the invention for defining a supporting structure for a three-dimensional object to be made through stereolithography is described with reference to the three-dimensional object represented in FIG. 1 and indicated therein by 1.

It should be noted since now that the three-dimensional object 1 has been purposely represented with a very simplified geometry compared to the objects that are commonly produced through stereolithography, in order to make the drawings clearer.

It is evident, however, that the description provided above can be analogously applied to a three-dimensional object with any geometry.

First of all the method includes the step of defining a first surface 3 to be supported, belonging to the three-dimensional object 1.

Obviously, a plurality of said first surfaces to be supported can be defined depending on the geometry of the object, the material used for the stereolithography process and other parameters, if necessary.

Obviously, the method of the invention can be applied to each one of said first surfaces.

According to the method, for each first surface 3 a second surface 4, facing the first one, is defined.

The second surface 4 can be separate from the three-dimensional object 1, as in the case shown in the figures.

As an alternative, the second surface 4 may belong to the three-dimensional object 1.

The first option is suitable for a first surface 3 intended to be arranged so that it faces the modelling plate that supports the three-dimensional object 1 during its production, with no need to interpose other parts of the object itself.

In particular, the second surface 4 can be defined in such a way that during the actual production of the three-dimensional object it coincides with the surface of said modelling plate.

Figure 2:
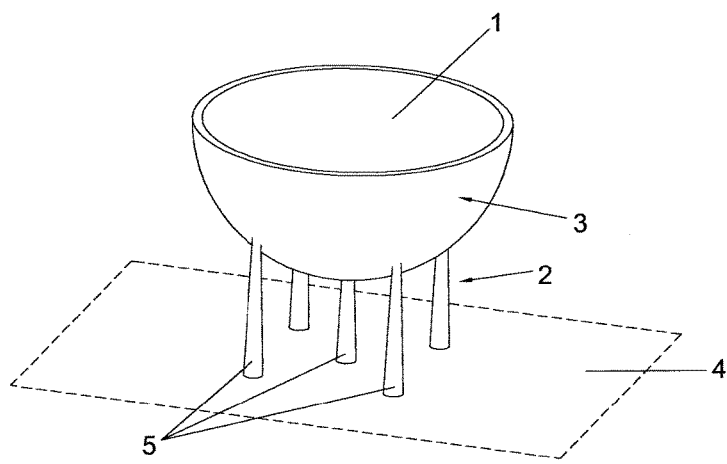
FIG. 2 shows an object obtained by joining the three-dimensional object of FIG. 1 and a part of the supporting structure according to the invention.
Figure 3:
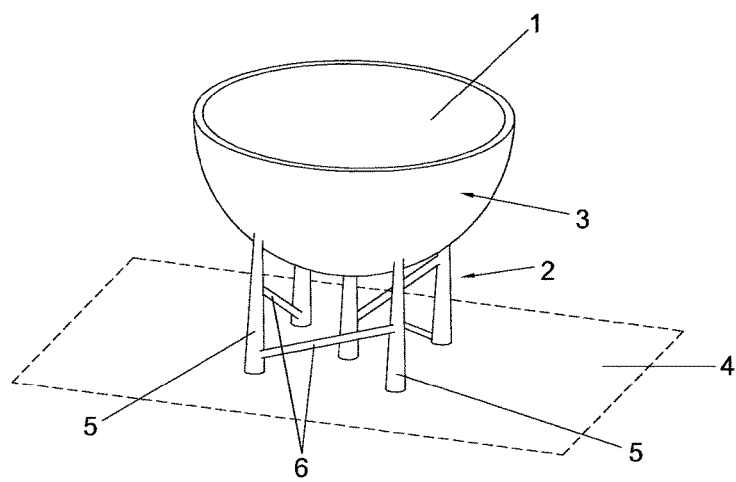
FIG. 3 shows an object obtained by joining the three-dimensional object of FIG. 1 and the supporting structure according to the invention.

This last case is the one illustrated in FIGS. 2 and 3, in which said second surface 4 is hatched.

Figure 6:
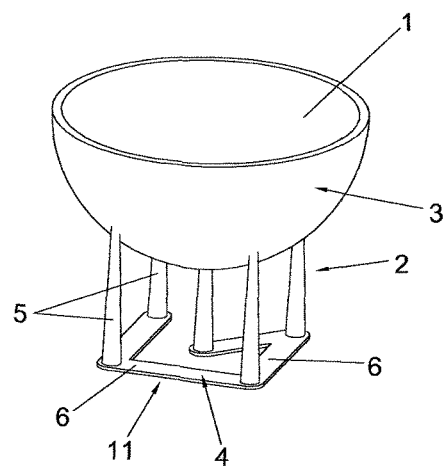
FIG. 6 shows a variant of the supporting structure of FIG. 3.

According to the variant embodiment shown in FIG. 6, the second surface 4 belongs to a supporting base 11 intended to be arranged in contact with said modelling plate. This variant is described in greater detail below.

When, instead, the first surface 3 is arranged in a cavity of the three-dimensional object 1 or, in any case, faces another surface of the object itself, the second surface 4 preferably belongs to the object.

In the latter case, the second surface 4 is preferably the surface of the three-dimensional object 1 that directly faces the first surface 3, for example the surface of said cavity that is opposite the first surface 3.

Obviously, in a single three-dimensional object 1 there may be a combination of the cases described above.

Once the first surface 3 and the second surface 4 have been defined, the method includes the step of defining a plurality of supporting elements 5 in an elongated shape, extending from the first surface 3 to the second surface 4, as shown in FIG. 2.

Analogously to that which has already been remarked, it should be pointed out that the supporting elements 5 shown in FIG. 2 have been purposely represented in a reduced number in order to simplify the representation.

It is however evident that, in general, the number of supporting elements will be higher than that shown in the figures and will depend on the geometry of the object and on other parameters.

In general, the number of supporting elements will be higher than two and in most cases higher than three.

Notwithstanding the above, the method described herein can be applied in any case, independently of the number of supporting elements provided.

Preferably but not necessarily, said supporting elements 5 are conical or cylindrical in shape, but they can obviously be also in other shapes.

The supporting elements 5 can also be provided with branches at one or both ends, in such a way as to be connected to the corresponding surface in several points. This type of branching is not represented in the figures, but is known per se.

Preferably, each supporting element 5 has a thinner portion located at the level of the first surface 3 and/or of the second surface 4, not represented in the figures, but known per se.

Said thinner portion offers the advantage of favouring the detachment of the supporting element 5 from the surfaces 3 and/or 4 once the stereolithography process during which the three-dimensional object 1 is actually produced has been completed.

The method also includes the operation of defining, for each pair of supporting elements 5, one or more reinforcing elements 6 in an elongated shape, preferably conical or cylindrical, that connect the two supporting elements 5 of said pair, as shown in FIG. 3.

To advantage, said reinforcing elements 6 make it possible to increase the resistance of the supporting structure 2 while maintaining the same overall volume of the latter or, alternatively, to reduce the volume of the supporting structure 2 while ensuring the same degree of resistance.

According to the invention, the pairs of supporting elements 5 to be connected to said reinforcing elements 6 are selected with the aid of the well-known graph theory.

In particular, the method includes the operation of defining a reference point 7 belonging to each supporting element 5.

A connected acyclic graph is then generated whose vertices are the reference points 7.

As is known, a graph is a mathematical construction consisting of one pair of sets V and E, wherein the elements of the first set V are points in space, called "vertices", while the elements of the second set E represent a corresponding number of links between pairs of vertices, which are called "edges".

Therefore, in mathematical notation, a graph G is expressed with the following relation $$G=(V,E).$$

From a formal point of view, an edge that connects two generic vertices u and v is represented by the pair (u, v) of the vertices themselves.

Clearly, given a set of vertices V, there is an infinity of possible graphs comprising said set V, which differ from one another for the set of edges E.

The requisite that the graph be a connected acyclic graph limits said graphs to a finite number.

In particular, the requisite that the graph be connected implies that for any two vertices of the graph there is a succession of edges that connect them.

The requisite that the graph be acyclic implies that any two vertices are connected through one and only one succession of edges.

In the theory of graphs, a connected acyclic graph of the type mentioned above is also called a "tree".

Advantageously, the connected acyclic graphs corresponding to a given set of vertices can be identified through suitable algorithms that are known per se.

Figure 4:
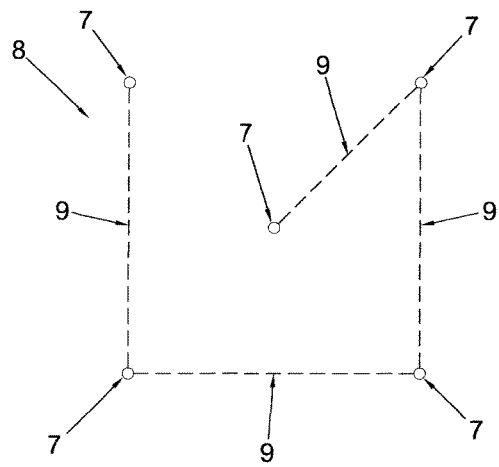
FIG. 4 shows a diagram of the links between the elements of the supporting structure of FIG. 3, in plan view.

FIG. 4 shows a schematic plan view of a connected acyclic graph 8 whose vertices are the reference points 7, which obviously is only one of the possible graphs having said properties.

In particular, each edge 9 of the graph 8 is represented in FIG. 4 by a dashed segment that extends between the respective reference points 7.

According to the method of the invention, the pairs of supporting elements 5 to be connected are identified by means of said connected acyclic graph 8.

In particular, for each edge 9 of the graph 8 a pair is defined that comprises the two supporting elements 5 corresponding to the ends of the edge 9 itself.

By defining the pairs of supporting elements 5 in the manner described above, it is possible to achieve the purpose of limiting the volume of the supporting structure 2 with respect to those obtainable with the known methods.

In fact, as is known from the theory of graphs, connected acyclic graphs are those graphs which, among all the graphs that can be defined on the same vertices, have the lowest number of edges, while at the same time maintaining all the vertices connected to one another.

In particular, the number of edges of a connected acyclic graph is equal to the number of vertices minus one.

Therefore, for a given number of reinforcing elements 6 between each pair of supporting elements 5, the definition of the pairs of supporting elements 5 as described above makes it possible to limit the number of links between said supporting elements and, therefore, the number of reinforcing elements 6, while at the same time maintaining all the supporting elements 5 connected to one another so as to obtain a stable supporting structure 2.

Advantageously, using the theory of graphs to define the pairs of reinforcing elements 5 makes it possible to use said known algorithms to generate a connected acyclic graph 8.

Preferably, for one or more pairs of supporting elements 5 a plurality of distinct reinforcing elements 6 is defined, which are indicatively shown in FIG. 3.

Advantageously, the presence of several reinforcing elements 6 for one pair of supporting elements 5 makes it possible to obtain a more stable connection between the supporting elements 5, especially when these are particularly long.

Consequently, to advantage, also the supporting structure 2 is more stable.

Obviously, in variant embodiments of the invention, the number of reinforcing elements 6 that connect a given pair of supporting elements 5 can be any and, moreover, it can vary in the different pairs of supporting elements 5.

Preferably, but not necessarily, the reinforcing elements 6 that connect each pair of supporting elements 5 are arranged according to mutually incident directions, in such a way as to define a sort of lattice, thus further increasing the stability of the connection.

Preferably, said connected acyclic graph 8 is defined in such a way that it coincides with the minimum spanning tree of a complete graph having the same vertices as the connected acyclic graph 8 and in which each edge is associated with a weight corresponding to the distance between the ends of the edge itself.

More precisely, it is known that a complete graph is a graph in which any pair of vertices is connected by at least one edge.

As is also known, the minimum spanning tree of a graph can be defined only after assigning a weight to each edge of the graph itself, as it is defined as that specific subset of the graph for which the sum of said weights is minimal.

In particular, if the weights are selected in such a way as to represent the lengths of the edges as described above, the minimum spanning tree corresponds to the tree whose edges have the minimum overall length.

Therefore, the criterion just described above to define the pairs of supporting elements 5 allows to obtain a supporting structure 2 in which the reinforcing elements 6 extend over the shortest possible path.

Consequently, to advantage, it is possible to minimize the volume of the supporting structure 2 while maintaining the same number of reinforcing to elements 6 between each pair of supporting elements 5.

Advantageously, said minimum spanning tree can be defined using mathematical algorithms known in the theory of graphs.

According to construction variants of the invention, said weights can be defined in a different manner from that which has been described above.

For example, it may be appropriate to connect one or more pairs of supporting elements 5 with reinforcing elements developed according to curved trajectories and/or broken lines. In this case, the edges are assigned corresponding weights equal to the lengths of the corresponding trajectories.

According to a construction variant of the invention, an additional pair of supporting elements 5 is defined at the level of each vertex having order 1 of the connected acyclic graph 8.

In particular, said additional pair comprises a first supporting element 5 corresponding to said vertex having order 1 and a second supporting element 5 corresponding to a vertex of the graph 8 not connected to the first vertex.

As is known, a vertex having order 1 is defined as a vertex appearing in only one edge of the graph, meaning a vertex connected to one and only one vertex of the graph.

Therefore, it can be understood that the definition of the additional pair described above advantageously implies that any supporting element 5 is connected to at least other two supporting elements 5, with the advantage of increasing the overall structural resistance of the supporting structure 2.

Figure 5:
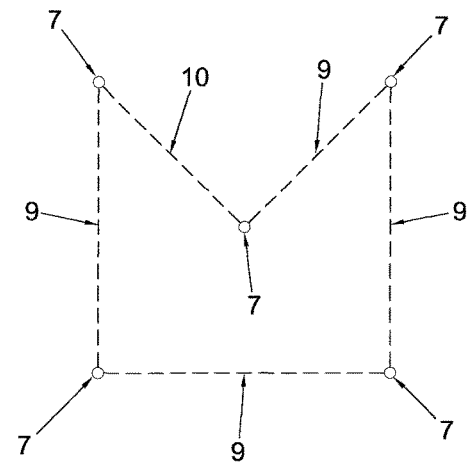
FIG. 5 shows a diagram of the links related to a variant of the supporting structure of FIG. 3, in plan view.

Indicatively, a possible additional pair is represented in FIG. 5 and indicated therein by the reference number 10.

Preferably, said additional pair is defined in such a way that the distance between the corresponding vertices of the connected acyclic graph 8 is the minimum possible distance.

Advantageously, the condition just described above makes it possible to limit to the minimum the length of the reinforcing elements 6 used to connect said additional pairs of supporting elements 5.

Preferably, the additional pairs are defined between two supporting elements 5, both corresponding to vertices of order 1, in such a way as to minimize the number of additional pairs introduced.

As already mentioned, FIG. 6 represents a construction variant of the invention in which the second surface 4 is separate from the three-dimensional object 1.

In particular, all of the reinforcing elements 6 lie on said second surface 4 and, therefore, connect the ends of the supporting elements 5.

Said configuration is such that the reinforcing elements 6 define a supporting base 11 suited to be arranged in contact with the modelling plate of the stereolithography machine in order to support the three-dimensional object 1.

Advantageously, a supporting base 11 shaped as described above has a much smaller volume than the supporting bases usually provided, which extend also over areas that are not affected by the presence of the supporting elements 5.

Preferably, the second surface 4 is planar, so that said supporting base 11 can adapt to a modelling plate provided with a planar surface, which corresponds to the type of modelling plate commonly used.

The supporting base 11 represented in FIG. 6 is defined by reinforcing elements 6 that extend between the supporting elements 5 according to the same links represented in FIG. 4.

Figure 7:
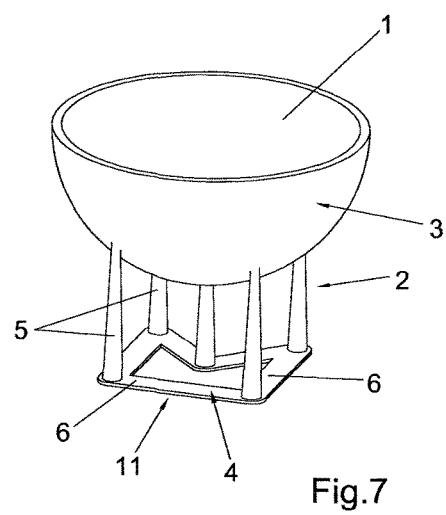
FIG. 7 shows a variant of the supporting structure of FIG. 6.

FIG. 7 represents a further construction variant of the invention, in which the supporting base 11 has the same links shown in FIG. 5.

This variant differs from the one shown in FIG. 6 due to the presence of an additional link between the supporting elements 5, corresponding to that indicated with the reference number 10 in FIG. 5.

According to the above, it can be understood that the graphs that can be obtained with the method according to the several variants described above can be used to make both a supporting structure 2 with a lattice-type configuration of the type shown in FIG. 3 and a supporting base 11 of the type shown in FIGS. 6 and 7.

Obviously, in variant embodiments of the invention the supporting structure 2 can be provided with both types of reinforcing elements 6, not necessarily based on the same pairs of supporting elements 5.

As regards the definition of the reference points 7, this is preferably carried out through the definition of a preferably planar reference surface intersecting all the supporting elements 5.

Each reference point 7 is defined in such a way that it belongs to the intersection area between the corresponding supporting element 5 and the reference surface.

Preferably, the reference surface is defined in such a way that it passes through the supporting elements 5 at the height of the respective median points.

According to a variant embodiment, the reference surface is defined in such a way that it coincides with the first surface 3 or with the second surface 4.

A further construction variant includes the definition of a reference surface in the manner described above and then the definition of a supporting point belonging to the area of intersection between each supporting element 5 and the reference surface.

Each one of said supporting points is projected on a predefined, preferably planar projection surface, in such a way as to obtain a corresponding reference point 7.

The projection surface may coincide with the first surface 3 or with the second surface 4.

The method described above can be applied also to several groups of supporting elements 5, wherein the reinforcing elements 6 connect the supporting elements 5 within each group, but do not connect the groups with one another.

In this case, the method is applied separately to each group of supporting elements 5 in order to generate the respective connected acyclic graphs 8.

This variant can advantageously be applied to the case in which there are groups of supporting elements 5 relatively close to one another, but at the same time far away from the other supporting elements 5, since this avoids the presence of excessively long reinforcing elements 6, with no need to neglect the internal stability of each group.

The method described so far is preferably implemented by means of a piece of equipment comprising a computer, not represented in the figures but known per se, provided with a processing unit and a memory support that can be accessed by said processing unit.

Said equipment comprises means for acquiring a first set of data representative of the geometry of the three-dimensional object 1 and loading it in said memory support.

The equipment furthermore comprises means for defining the first surface 3 to be supported and means for defining the respective second surface 4.

The equipment furthermore comprises means for defining the supporting elements 5, means for defining the pairs of supporting elements 5 and means for defining the reinforcing elements 6 between said pairs.

The equipment also comprises means for generating a second set of data representative of the geometry resulting from the union of the supporting elements 5 and the reinforcing elements 6 with the three-dimensional object 1 and for loading said second set of data in the memory support.

According to the invention, the means for defining the pairs of supporting elements 5 comprise means for defining a reference point 7 belonging to each supporting element 5, means for defining said connected acyclic graph 8 and means for defining one pair of supporting elements for each edge 9 of said connected acyclic graph 8 as described above.

Said equipment is preferably configured by means of a computer program product comprising a data support provided with program portions configured in such a way that, when executed on said computer, they define the means of the equipment as described above.

According to the explanations provided above, it can be understood that the method, the equipment and the computer program product described above achieve all of the set objects.

In particular, the invention makes it possible to obtain a supporting structure having a reduced volume compared to the supporting structures defined according to the known art.

The invention claimed is:

1. A method for producing a three-dimensional object including a supporting structure in a stereolithography machine, comprising the following operations:

loading a first set of data representative of the geometry of said three-dimensional object into a memory of a computer which controls the stereolithography machine;

storing in the memory of the computer a program of instructions;

executing the program of instructions and performing the functions of:

defining a first surface to be supported belonging to said three-dimensional object;

defining a second surface facing said first surface;

defining a plurality of supporting elements having an elongated shape and extending from said first surface to said second surface;

defining a plurality of pairs of said supporting elements;

for each pair of said plurality of pairs of supporting elements, defining at least one reinforcing element having an elongated shape and connecting the two supporting elements of said pair;

wherein said defining said at least one reinforcing element comprises:

defining a reference point belonging to each one of said supporting elements;

defining a connected acyclic graph having as vertices said reference points and comprising corresponding edges between said vertices; and defining one of said pairs of supporting elements for each one of said edges, said pair comprising the two supporting elements corresponding to the ends of said edge;

and wherein said defining said plurality of pairs of supporting elements comprises defining an additional pair of supporting elements for each vertex having order 1 of said connected acyclic graph, said additional pair comprising a first supporting element corresponding to said vertex having order 1 and a second one of said supporting elements not connected to said first supporting element through any of said edges; and generating and storing in the memory of a second set of data representative of the geometry resulting form the union of said supporting elements and said reinforcing elements with said three-dimensional object: and driving the stereolithography machine according to the second set of data to produce the three-dimensional object, the supporting elements and the reinforcing elements through formation of sequential superimposition of solidified layers under control of the computer.

2. Method according to claim 1, wherein said connected acyclic graph is defined in such a way that said connected acyclic graph coincides with the minimum spanning tree of a complete graph having the same vertices as said connected acyclic graph and in which each edge is assigned a weight equal to a value of the distance between the ends of said edge.

3. Method according to claim 1, wherein said additional pairs are defined in such a way that a sum of the distances between corresponding vertices of said connected acyclic graph is minimal.

4. Method according to claim 1, wherein said operation of defining said at least one reinforcing element includes defining a plurality of said reinforcing elements distinct from one another for at least one pair of said plurality of pairs of supporting elements.

5. Method according to claim 1, wherein said second surface belongs to said three-dimensional object.

6. Method according to claim 1, wherein said second surface is separate from said three-dimensional object and all of said reinforcing elements lie on said second surface.

7. Method according to claim 6, wherein said second surface is planar.

8. Method according to claim 1, wherein one of said supporting elements has a corresponding thinner portion located at the level of the first surface or of the corresponding second surface.

9. Method according to claim 1, wherein said reinforcing elements have a conical or cylindrical shape.

10. Method according to claim 1, wherein said definition of said reference points comprises:

defining a reference surface intersecting all of said supporting elements;

for each supporting element, defining a corresponding reference point in an area of intersection between said supporting element and said reference surface.

11. Method according to claim 10, wherein said reference surface coincides with said first surface or with said second surface.

12. Method according to claim 1, wherein said definition of said reference points comprises:

defining a reference surface intersecting all of said supporting elements;

defining a support point in an area of intersection between each supporting element and said reference surface;

defining a projection surface;

defining each one of said reference points as the projection of a corresponding one of said support points on said projection surface.

13. Equipment for producing a supporting structure for a three-dimensional object in a stereolithography process, comprising:

a computer comprising a processing unit and a memory support accessible by said processing unit;

means for acquiring a first set of data representative of the geometry of said three-dimensional object and for loading said first set of data in said memory support;

means for defining a first surface to be supported belonging to said three-dimensional object;

means for defining a second surface facing said first surface;

means for defining a plurality of supporting elements having an elongated shape and extending from said first surface to said second surface;

means for defining a plurality of pairs of said supporting elements;

means for defining, for each pair of said plurality of pairs of supporting elements, at least one reinforcing element having an elongated shape and connecting the two corresponding supporting elements;

said means for defining at least one reinforcing element comprising:

means for defining a reference point belonging to each one of said supporting elements;

means for defining a connected acyclic graph having as vertices said reference points and comprising corresponding edges between said vertices; and means for defining one pair of supporting elements for each one of said edges, said pair comprising two supporting elements corresponding to the ends of said edge;

characterized in that said means for defining said plurality of pairs of supporting elements are configured so as to define an additional pair of supporting elements for each vertex having order 1 of said connected acyclic graph, said additional pair comprising a first supporting element corresponding to said vertex having order 1 and a second one of said supporting elements not connected to said first supporting element through any of said edges;

means for generating a second set of data representative of a geometry resulting from a union of said supporting elements and said reinforcing elements with said three-dimensional object and for loading said second set of data in said memory support; and means for producing the three-dimensional object, the supporting elements and the reinforcing elements according to the second set of data through formation of sequential superimposition of solidified layers under control of the computer.

14. A non-transitory computer readable medium storing computer executable instructions which when executed on a computer controlling a stereolithography machine comprising a processing unit and a memory support accessible by said processing unit, said stereolithography machine producing a three-dimensional object and support structure, the executable instructions comprising instructions for:

acquiring a first set of data representative of a geometry of said three-dimensional object and for loading said first set of data in said memory support;

defining a first surface to be supported belonging to said three-dimensional object;

defining a second surface facing said first surface;

defining a plurality of supporting elements having an elongated shape and extending from said first surface to said second surface;

defining a plurality of pairs of said supporting elements;

defining, for each pair of said plurality of pairs of supporting elements, at least one reinforcing element having an elongated shape and connecting the two corresponding supporting elements;

said instructions for defining said at least one reinforcing element comprising instructions for:

defining a reference point belonging to each one of said supporting elements;

defining a connected acyclic graph having as vertices said reference points and comprising corresponding edges between said vertices; and defining one pair of supporting elements for each one of said edges, said pair comprising the two supporting elements corresponding to the ends of said edge;

wherein said defining said plurality of pairs of supporting elements are configured so as to define an additional pair of supporting elements for each vertex having order 1 of said connected acyclic graph, said additional pair comprising a first supporting element corresponding to said vertex having order 1 and a second one of said supporting elements not connected to said first supporting element through any of said edges; and generating a second set of data representative of the geometry resulting from the union of said supporting elements and said reinforcing elements with said three-dimensional object and for loading said second set of data in said memory support.

* * * * *